US009984389B2

(12) United States Patent
Nozawa

(10) Patent No.: US 9,984,389 B2
(45) Date of Patent: May 29, 2018

(54) FLYING TYPE IN-STORE ADVERTISING SYSTEM

(71) Applicant: ENUKANTO CO., LTD., Tokyo (JP)

(72) Inventor: Toshio Nozawa, Tokyo (JP)

(73) Assignee: ENUKANTO CO., LTD., Tokyo (JP)

( * ) Notice: Subject to any disclaimer, the term of this patent is extended or adjusted under 35 U.S.C. 154(b) by 0 days. days.

(21) Appl. No.: 15/350,432

(22) Filed: Nov. 14, 2016

(65) Prior Publication Data

US 2017/0337581 A1 Nov. 23, 2017

(30) Foreign Application Priority Data

May 17, 2016 (JP) .................................. 2016-098660

(51) Int. Cl.
*G06Q 30/02* (2012.01)
(52) U.S. Cl.
CPC ............................... *G06Q 30/0261* (2013.01)
(58) Field of Classification Search
CPC ............................................... G06Q 30/0261
USPC ........................................................... 701/2
See application file for complete search history.

(56) References Cited

U.S. PATENT DOCUMENTS

2014/0277854 A1* 9/2014 Jones ..................... G05D 1/102
701/3

FOREIGN PATENT DOCUMENTS

| DE | 102007054126 A1 | 5/2009 |
|---|---|---|
| JP | 2003341599 A | 12/2003 |
| JP | 2005172879 A | 6/2005 |
| JP | 2005266724 A | 9/2005 |
| JP | 2005338114 A | 12/2005 |
| WO | 2014080388 A2 | 5/2014 |
| WO | 2016067488 A1 | 5/2016 |

\* cited by examiner

*Primary Examiner* — Brian P Sweeney
(74) *Attorney, Agent, or Firm* — Michael Best & Friedrich LLP

(57) ABSTRACT

Provided is a flying type in-store advertising system which advertises to many customers dispersed to respective counters while flying above an in-store passage for a commodity, an event or the like. In a flying type in-store advertising system of allowing an unmanned aircraft 11 displaying an in-store advertisement to fly in accordance with flight route data of an in-store passage, which is sent from a flight control terminal 12, the unmanned aircraft 11 has an aircraft side communication means 26 and an aircraft flight means 27 for allowing the unmanned aircraft 11 to fly in accordance with the flight route data, and the flight control terminal has a flight route setting means 35, a storage means 36 for storing the flight route data, a terminal side communication means 37 and a terminal side control means 42.

20 Claims, 4 Drawing Sheets

[FIG. 4]
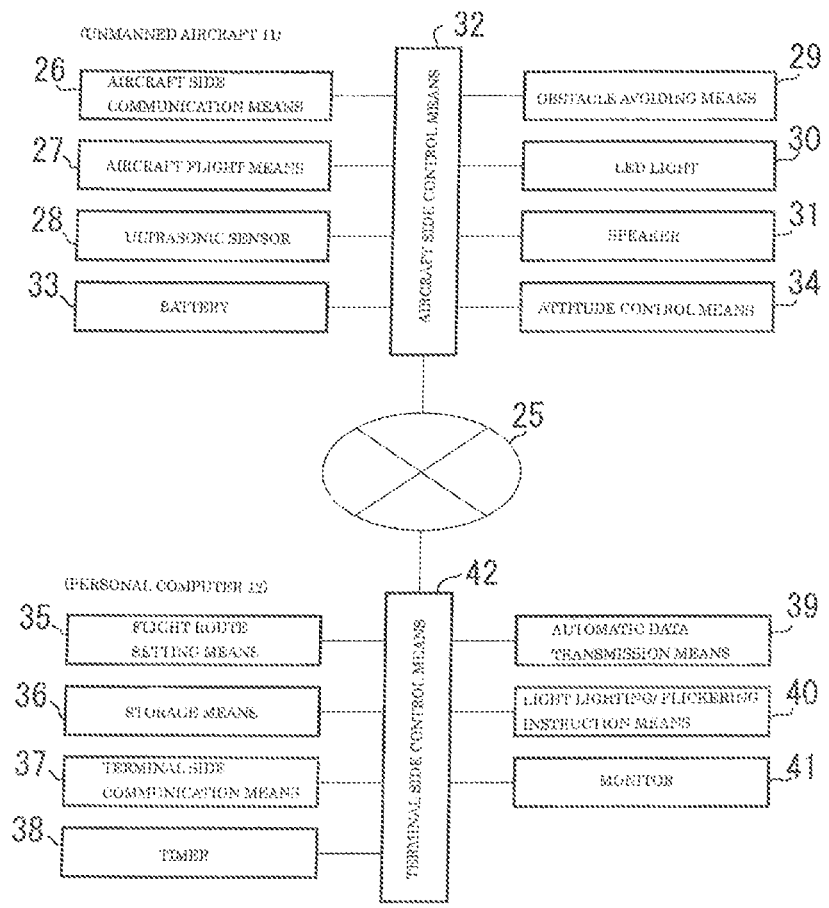

FLYING TYPE IN-STORE ADVERTISING SYSTEM

BACKGROUND OF THE INVENTION

1. Field of the Invention

The present invention relates to a flying type in-store advertising system, and particularly to a flying type in-store advertising system for advertising a commodity, an event or the like while flying in a store, using an unmanned aircraft (flying drone).

2. Description of Related Art

For example, in a clothing counter, a fresh food counter or the like of a department store or a supermarket, a limited-time special offer for selling specific commodities at low prices within a limited time is executed, in order to enhance the willingness of customers to buy.

An in-store advertisement of the limited-time special offer has been performed by posting a POP sheet on which commodity names, prices and the like are written, beside a display shelf of bargain sale commodities or by suspending it from a ceiling, so as to attract attention of customers (for example, see Non-Patent Document 1).

However, such an in-store advertising method can inform a start of the limited-time special offer only to some customers near the display shelf on which the bargain sale commodities are placed, and, for example, in a multistoried department store or a supermarket having a large sales floor area, it cannot appeal the limited-time special offer to many customers dispersed to respective counters in the store.

Non-Patent Document 1: MATCHA, We ask Japanese housewives! How to utilize supermarkets [searched on May 3, 2016], internet <URL: http://mcha.jp/8572>

SUMMARY OF THE INVENTION

Then, as a result of intensive studies, the present inventor has found that when an unmanned aircraft which displays an in-store advertisement is allowed to fly in accordance with flight route data of an in-store passage, which is sent from a flight control terminal, the above-mentioned problems are all solved, thus completing the present invention.

The present invention has been made in view of such conventional problems, and an object thereof is to provide a flying type in-store advertising system which can advertise to many customers dispersed to respective counters while flying above an in-store passage for a commodity, an event or the like.

The present invention is a flying type in-store advertising system of allowing an unmanned aircraft which displays an in-store advertisement to fly in accordance with flight route data of an in-store passage, which is sent from a flight control terminal, wherein the unmanned aircraft comprises an aircraft side communication means for performing wireless communication or communication through an internet line, an aircraft flight means for allowing the unmanned aircraft to fly in accordance with the flight route data of the in-store passage from the flight control terminal, which is received by the aircraft side communication means, and an aircraft side control means for controlling an overall electric system of the unmanned aircraft; and the flight control terminal comprises a flight route setting means for setting a flight route of the in-store passage, a storage means for storing the flight route data obtained by the flight route setting means, a terminal side communication means for performing wireless communication or communication through an internet line, and a terminal side control means for controlling an overall electric system of the flight control terminal.

Further, in the flying type in-store advertising system of the present invention, the unmanned aircraft is also provided with a hooking tool for hooking an advertising paper medium on which the in-store advertisement is displayed.

Still further, in the flying type in-store advertising system of the present invention, the flight control terminal has a timer, the flight route data to which the unmanned aircraft flight time set by the timer is added is stored in the storage means, and further, the flight control terminal is provided with an automatic data transmission means for sending the flight route data stored in the storage means from the terminal side communication means to the aircraft side communication means at a time set by the timer.

Furthermore, in the flying type in-store advertising system of the present invention, the unmanned aircraft comprises an obstacle approach detection sensor for detecting approach to an obstacle, and an obstacle avoiding means for avoiding contact of the unmanned aircraft with the obstacle by temporarily changing the flight route, based on an obstacle approach detection signal from the obstacle approach detection sensor.

Moreover, in the flying type in-store advertising system of the present invention, the unmanned aircraft is provided with a speaker for giving commodity information in voice.

In addition, in the flying type in-store advertising system of the present invention, the unmanned aircraft is provided with LED lights for attracting attention of customers.

Additionally, in the flying type in-store advertising system of the present invention, as the unmanned aircraft, one having a weight of 200 g or less is adopted.

Besides, in the flying type in-store advertising system of the present invention, the unmanned aircraft is provided with a parachute.

As the unmanned aircraft (flying drone), one of a propeller flying system can be adopted.

As the aircraft flight means, one of an autonomous flying system can be adopted. The autonomous flying system of the unmanned aircraft may be arbitrary. For example, the autonomous flying may be performed by recognizing images of the in-store passage based on camera images.

The in-store advertisement displayed on the unmanned aircraft is arbitrary. Further, a method of displaying the in-store advertisement on the unmanned aircraft is also arbitrary. For example, the in-store advertisement may be displayed (described) directly or indirectly on a fuselage part of the unmanned aircraft, or various advertising media may be connected to the unmanned aircraft.

As the flight control terminal, there can be used various mobile terminals such as a smart phone and a tablet, as well as a personal computer.

A store to which the flying type in-store advertising system is applied is not limited. Examples thereof include department stores, supermarkets, general supermarkets (malls) and the like. The store may be either a single-story building or a multi-story building.

The flight route is set in accordance with the in-store passage of the store. It may be either the route over the whole in-store passage or the route over a part thereof. Further, the unmanned aircraft may fly through the flight route either only once or a plurality of times.

The flight route setting means as used herein may be, for example, a manual input part such as a key board for performing a manual input to the flight control terminal by an operator, or a means of automatically setting the flight route.

The aircraft side communication means and the terminal side communication means may perform wireless communication or communication through an internet line.

The terminal side communication means of the unmanned aircraft used herein means a CPU (central processing unit) mounted on the flight control terminal, or the like.

As the storage means, a main memory (RAM or ROM) of the flight control terminal can be adopted.

As the advertising paper medium, there can be adopted a POP sheet, a poster, a flyer, a leaflet, a label or the like.

As the hooking tool, there can be adopted various hooking tools (such as a clip and a hook) or hanging members (such as a string and a yarn).

As the timer, various electronic timepieces, radio wave timepieces or the like can be adopted.

The automatic data transmission means as used herein automatically sends the flight route data stored in the storage means from the terminal side communication means of the flight control terminal to the aircraft side communication means by utilizing the wireless communication or the internet line when the set time comes.

As the obstacle approach detection sensor, there can be adopted various approach sensors which detect approach of obstacles in a non-contact state.

As the obstacle avoiding means, there can be adopted one which can sense and avoid surrounding obstacles, for example, by mounting obstacle avoiding sensors. Specific examples thereof include that the unmanned aircraft is provided with 4 ultrasonic sensors for detecting forward, right and left and upward obstacles, and automatically moves avoiding the obstacles when it approaches the obstacles.

The voice from the speaker may be electronic voice stored in the storage means of the flight control means or natural voice of an operator (store clerk). In the case of the natural voice, it may be voice previously stored in the storage means or voice obtained from a microphone electrically connected to the flight control terminal.

With respect to the kind of LED lights, monochromatic or multichromatic LEDs can be adopted. The LED lights may be either lighted or flickered. The number of the LED lights used is arbitrary.

Although the weight of the unmanned aircraft is not limited, it is preferably less than 200 g (corresponding to a model aircraft), which is not restricted by the amended Civil Aeronautics Law (enforced on Dec. 10, 2015).

The unmanned aircraft is preferably provided with the parachute, in order to prevent an accident of falling down of the aircraft due to battery exhaustion or the like. As an opening means of the parachute, there can be adopted one which detects the accident such as the battery exhaustion in flight and automatically opens a sealing lid for the parachute sealed in a body of the unmanned aircraft, or the like.

The parachute may be, for example, a ram air type parachute used in a paraglider, as well as a common mushroom type parachute, and may be any as long as it can gradually fall down.

According to the flying type in-store advertising system, the unmanned aircraft which displays the in-store advertisement is allowed to fly in accordance with the flight route data of the in-store passage, which is sent from the flight control terminal by utilizing the wireless communication or the communication through the interne line. In that case, the flying unmanned aircraft attracts attention of the customers around the passage, and the customers see the in-store advertisement displayed on the unmanned aircraft, thereby being able to inform the advertisement of a commodity, an event or the like to the many customers dispersed to respective counters.

BRIEF DESCRIPTION OF THE DRAWINGS

FIG. 3 (*b*) is a perspective view showing a use state of an unmanned aircraft when an advertising paper medium in a flying type in-store advertising system according to Example 1 of the invention is one approximately rectangular sheet; and FIG. 3 (*c*) is a perspective view showing a use state of an unmanned aircraft when an advertising paper medium in a flying type in-store advertising system according to Example 1 of the invention is 4 approximately rectangular sheets.

FIG. 4 is a block diagram showing an electrical system of a flying type in-store advertising system according to Example 1 of the invention.

DETAILED DESCRIPTION OF THE PREFERRED EMBODIMENTS

Examples of the present invention are specifically described below.

Figure 1:
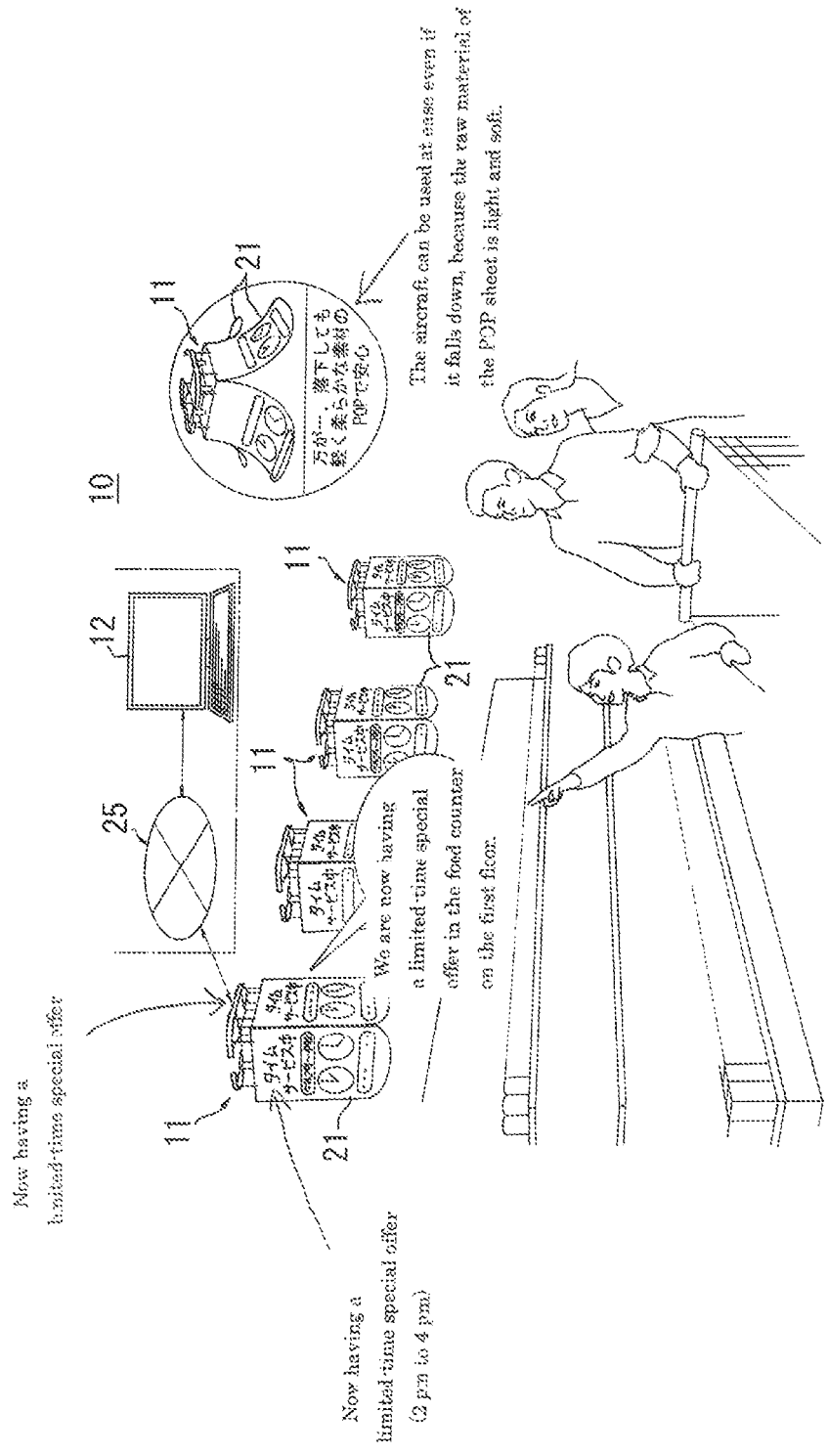
FIG. 1 is a perspective view showing a use state of a flying type in-store advertising system according to Example 1 of the invention.

In FIG. 1, 10 is a flying type in-store advertising system according to Example 1 of the present invention, and the flying type in-store advertising system 10 allows 4 unmanned aircrafts 11 to fly on each of which an in-store advertisement of a limited-time special offer is displayed, in accordance with flight route data of an in-store passage, which is sent from a personal computer (flight control terminal) 12, in a second floor portion of a two-story large supermarket. These are specifically described below.

Figure 2:
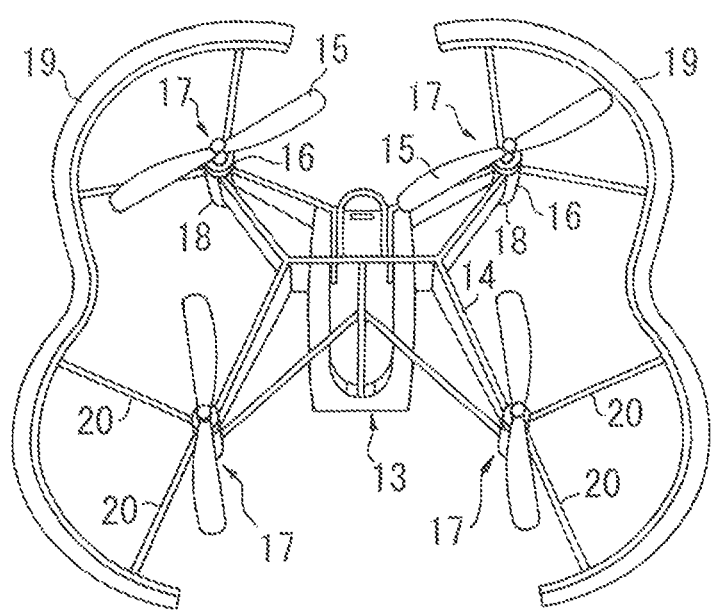
FIG. 2 is a perspective view showing an unmanned aircraft which is a part of a flying type in-store advertising system according to Example 1 of the invention.

As shown in FIG. 2, each unmanned aircraft 11 is a vertical take-off and landing quadcopter type flying drone having a total weight of 190 g. Each unmanned aircraft 11 has an aircraft body 13 arranged in the center thereof, and 4 support arms 14 radially extend at 90° intervals from the aircraft body 13. A propulsion unit 17 having a propeller 15 and a motor 16 for rotating it is disposed on a tip part of each support arm 14. The 4 propulsion units 17 are disposed in total. A leg 18 for landing is disposed at a lower part of each propulsion unit 17.

Further, a pair of right and left side bumpers 19 are arranged on the right and left sides of the aircraft body 13, in line symmetry with respect to the aircraft body 13 as a center. Each side bumper 19 is an elongated frame body, has a gently-sloping two-mountain curved shape, and extends beyond a rotation area of the propeller 15 in a horizontal plane. Furthermore, each side bumper 19 is connected to the aircraft body 13 through two elongated supporting frames 20 radially extending from a tip of the corresponding support arm 14. Even when the unmanned aircraft 11 in flight collides with an obstacle by accident, the propeller 15 can be protected, because there is the side bumper 19 between the obstacle and the propeller 15. In addition, the side bumper 19 has an effect of laterally rebounding the unmanned aircraft 11 by coming into contact with the obstacle, so that the unmanned aircraft 11 can be separated from the obstacle.

Figure 3:
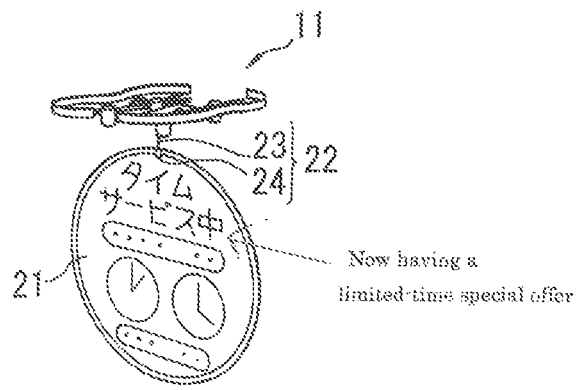
FIG. 3 (*a*) is a perspective view showing a use state of an unmanned aircraft when an advertising paper medium in a flying type in-store advertising system according to Example 1 of the invention is one circular sheet.
Figure 3:
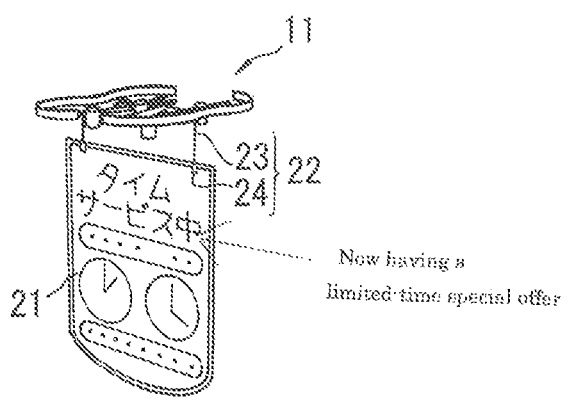
Figure 3:
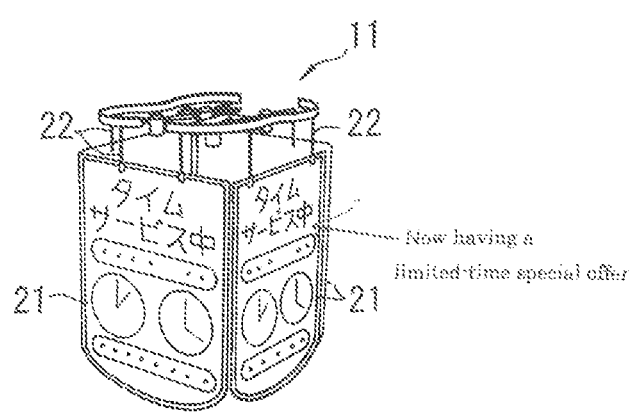

As shown in FIG. 3, each unmanned aircraft 11 is provided with a predetermined number of suspending hooking tools (hooking tools) 22 for hooking in a suspended state an advertising paper sheet (advertising paper medium) 21 of A4 paper size on which the in-store advertisement is displayed. The suspending hooking tool 22 has a short connecting pin 23 an upper part of which is detachably connected to a lower surface of a predetermined part of the unmanned aircraft 11 and a clip 24 attached to a lower end part of the connecting pin 23.

As shown in FIG. 3 (a), when the advertising paper sheet 21 is one circular sheet, the one suspending hooking tool 22 is attached to the center of the lower surface of the aircraft body 13, and an upper part of the circular advertising paper sheet 21 is hooked (gripped) by the clip 24 of the suspending hooking tool 22. Further, as shown in FIG. 3 (b), when the advertising paper sheet 21 is one substantially rectangular sheet, the suspending hooking tools 22 are each disposed on a lower surface of an intermediate part in a longitudinal direction of each of the right and left side bumpers 19, and a pair of upper corner parts of the substantially rectangular advertising paper sheet 21 are each hooked by each clip 24. Furthermore, as shown in FIG. 3 (c), when 4 substantially rectangular sheets are used as the advertising paper sheets 21, the suspending hooking tools 22 are each disposed on each of both end parts in the longitudinal direction of each side bumper 19 and on each of both side parts of a central part in the longitudinal direction of each side bumper 19 (eight holding tools in total), and both upper corner parts of each substantially rectangular advertising paper sheet 21 are hooked by the respective clips 24. The case where 4 advertising paper sheets 21 are suspended is taken as an example herein.

As described above, the 4 large-sized advertising paper sheets 21 on each of which the advertisement is printed are detachably suspended from front, rear, right and left sides of the aircraft body 13 through the suspending hooking tools 22, so that the advertisement for a commodity, an event or the like can be informed to not only customers shopping near the unmanned aircraft 11, but also customers in respective counters apart from the unmanned aircraft 11. Further, each advertising paper sheet 21 can be detachably attached to the unmanned aircraft 11 by utilizing the suspending hooking tool 22.

Next, an electrical system of the unmanned aircraft 11 is described with reference to the block diagram of FIG. 4. The unmanned aircraft 11 has an aircraft side communication means 26 for performing communication through an internet line 25, an aircraft flight means 27 for allowing the unmanned aircraft 11 to fly in accordance with flight route data of an in-store passage from a personal computer 12, which is received by the aircraft side communication means 26, 4 ultrasonic sensors (obstacle approach detection sensors) 28 for detecting forward, right and left and upward obstacles, an obstacle avoiding means 29 for sensing the surrounding obstacles by means of these ultrasonic sensors 28 and allowing the unmanned aircraft 11 in flight to avoid the obstacles so as not to collide therewith, LED lights 30, a speaker 31, an aircraft side control means 32 for controlling an overall electric system of the unmanned aircraft 11, and a battery 33.

The aircraft flight means 27 allows the unmanned aircraft 11 to fly in accordance with the flight route data of the in-store passage, based on a command from the aircraft side control means 32, and has an attitude control means 34 for performing attitude control in the air by movement of the center of gravity caused by a linear actuator. That is, the aircraft flight means 27 controls the motors 16 of the 4 propulsion units 17, the obstacle avoiding means 29 and the linear actuator of the attitude control means 34.

The obstacle avoiding means 29 has the 4 ultrasonic sensors 28 for detecting the forward, right and left and upward obstacles, and senses the surrounding obstacles by means of the respective ultrasonic sensors 28. When the unmanned aircraft 11 in flight approaches the obstacle, the unmanned aircraft 11 automatically moves so as to avoid the obstacle to prevent collision (contact) therewith.

The LED lights 30 are many full-color (RGB) LEDs disposed in an outer periphery of the aircraft body 13 so as to be lighted or flickered at predetermined intervals under control by the aircraft side control means 32.

The speaker 31 is provided outside the aircraft body 13, and performs voice output under control by the aircraft side control means 32. The original information thereof is supplied from the personal computer 12 and received by the aircraft side communication means 26.

The aircraft side control means 32 incorporates a CPU. A storage means for storing the flight route data of the in-store passage, which is sent from the personal computer 12, may be electrically connected to the aircraft side control means 32.

Then, the personal computer 12 is described with reference to the block diagram of FIG. 4.

The personal computer 12 has a flight route setting means 35 for setting the flight route of the in-store passage, a storage means 36 for storing the flight route data obtained by the flight route setting means 35, a terminal side communication means 37 for performing communication through the internet line 25, a timer 38, an automatic data transmission means 39, a light lighting/flickering instruction means 40, a monitor 41 and a terminal side control means 42 for sending the flight route data stored in the storage means 36 from the terminal side communication means 37 to the aircraft side communication means 26 and controlling an overall electric system of the personal computer 12.

These constituents are specifically described below.

The flight route setting means 35 is an application for setting the flight route of the unmanned aircraft 11 according to the in-store passage. After stating the flight route setting means 35, an in-store layout including the in-store passage and a takeoff/landing station of the unmanned aircraft 11 are written in an in-store layout creation screen displayed on the monitor 41 using a mouse or the like, and further, the flight route above the in-store passage, through which the unmanned aircraft 11 is desired to be allowed to fly, is written therein. A plurality of the flight routes may be created. The layout of the second floor of the large supermarket, on which daily necessities, articles of clothing and the like are sold, is created herein.

The storage means 36 is a memory (RAM) incorporated in the personal computer 12. Time data (start at 2 pm and end at 4 pm) with respect to holding of a limited-time sale is added to the flight route data stored in the storage means 36. Further, an in-store advertisement information of a commodity sold in a limited-time sale held in a food counter on the first floor, which has been previously recorded with a microphone by a store clerk, is also stored in the storage means 36.

The timer 38 is a digital clock incorporated in the personal computer 12.

When the timer 38 reaches the set time, the automatic data transmission means 39 automatically sends the specific flight route data stored in the storage means 36 from the terminal side communication means 37 of the personal computer 12 to the aircraft side communication means 26 using the internet line 25.

The terminal side control means 42 incorporates a CPU.

An in-store advertising method by the flying type in-store advertising system 10 according to Example 1 of the present invention is described below with reference to FIG. 1 to FIG. 4. The unmanned aircraft 11 is assumed to be always in a flying standby state using the battery 33 as a power supply.

As shown in FIG. 1 to FIG. 4, in the personal computer 12, when the timer 38 detects 2 pm that is the starting time of the limited-time sale, the automatic data transmission means 39 operates, and the flight route data of the in-store passage, which is stored in the storage means 36, and the in-store advertisement information (voice data) are automatically sent from the terminal side communication means 37 to the unmanned aircraft 11 through the internet line 25, by a command from the terminal side control means 42.

Subsequently, when the aircraft side communication means 26 of the unmanned aircraft 11 receives these data signals, each data is sent to the aircraft side control means 32. Thereafter, the motors 16 of the 4 propulsion units 17 are each rotated based on a command from the aircraft side control means 32, and the unmanned aircraft 11 floats and flies above the in-store passage in accordance with the flight route data of the in-store passage (FIG. 2). At this time, the unmanned aircraft 11 flies in a state of suspending the 4 advertising paper sheets 21 arranged on the front, rear, right and left sides of the aircraft body 13 and while keeping a height of 3 meters from a floor surface. An attitude in flight is controlled by the movement of the center of gravity caused by the linear actuator, based on a command from the attitude control means 34.

When the unmanned aircraft 11 approaches the obstacle in flight, the 4 ultrasonic sensors 24 whose detection areas are forward, right and left and upward areas of the aircraft detect it, and detection signals thereof are sent from the aircraft side control means 32 to the obstacle avoiding means 29. Thereafter, the outputs of the motors 16 of the 4 propulsion units 17 are appropriately changed based on a command from the obstacle avoiding means 29, and the unmanned aircraft 11 automatically takes an avoidance action. This makes it possible to avoid the collision with the obstacle.

On the other hand, the in-store advertisement information is sent from the aircraft side control means 32 to the speaker 31. An announcement informing a limited-time special offer, for example, "a limited-time special offer is held in the food counter on the first floor", is made.

Further, when the many LED lights 30 disposed in the outer periphery of the aircraft body 13 are lighted or flickered, the light lighting/flickering instruction means 40 is started by an input operation of the personal computer 12, and a signal for lighting or flickering the LED lights 30 is sent from the terminal side communication means 37 to the aircraft side communication means 26 using the internet line 25. Thereby, commands are sent from the aircraft side control means 32 to the respective LED lights 30 to cause the LED lights 30 to be lighted or flickered. Thus, attention can be attracted by not only customers shopping around the unmanned aircraft 11, but also customers being apart therefrom, so that an advertising effect by the advertising paper sheet 21 and the voice from the speaker 31 can be further enhanced.

The unmanned aircraft 11 may be allowed to fly above the in-store passage only one round (once), or may be allowed to fly circulatedly during a period while the limited-time special offer is held. Further, after making one round flight above the set in-store passage, the unmanned aircraft 11 may return to the takeoff/landing station, followed by charging the battery 33, and may be allowed to fly again after a predetermined period of time.

As described above, the unmanned aircraft 11 displaying the in-store advertisement is allowed to fly in accordance with the flight route data sent from the personal computer 12. Accordingly, the unmanned aircraft 11 flying above the in-store passage attracts attention of customers around the passage, and the customers view the in-store advertisement, thereby being able to advertise holding of the limited-time special offer or the commodity to the many customers dispersed to respective counters.

Further, the unmanned aircraft 11 has a weight of 190 g, so that it can be regarded to be a model aircraft which is not restricted by the amended Civil Aeronautics Law enforced on Dec. 10, 2015.

In this unmanned aircraft 11, the aircraft body 13 may be provided with a parachute not shown, in order to prevent an accident of falling down of the unmanned aircraft 11 due to battery exhaustion or the like. Specifically, a housing part containing the parachute is mounted on an upper part of the aircraft body 13, and an opening thereof is openably/closably closed with a lid. Moreover, the parachute housing part is provided with a solenoid which blows away the lid outward in an emergency.

When the aircraft side control means 32 detects a state where the attitude control of the unmanned aircraft 11 by means of the attitude control means 34 is impossible, a command is sent from the aircraft side control means 32 to the solenoid, and a solenoid pin blows away the lid outward, thereby automatically opening the parachute. Thus, the propeller 15 and the like can be prevented from being damaged by falling down of the unmanned aircraft 11, and even when the falling unmanned aircraft 11 comes into contact with the customers, it is less likely to inflict injury to them.

Such a constitution may be employed that an RFID (radio frequency identifier) (which exchanges information from an RF tag with an ID information embedded therein, through short-distance (several centimeters to several meters depending on the distance) wireless communication) in which features of a commodity (new commodity) or data of a bargain sale is stored in a storage part is previously attached to a commodity display shelf, a commodity sample or the like, and that thereafter, when the unmanned aircraft 11 approaches the RFID, the commodity data wirelessly transmitted from the RFID is received by a wireless communication means mounted on the unmanned aircraft 11 and then sent to the aircraft side control means 32, thereby allowing the unmanned aircraft 11 to circle around near the display shelf or announcing the features of the commodity or bargain sale information from the speaker 31.

INDUSTRIAL APPLICABILITY

The flying type in-store advertising system of the present invention is a useful technique as a flying type in-store advertising system for advertising a commodity, an event or the like while flying in a store.

DESCRIPTION OF REFERENCE NUMERALS AND SIGNS

10: Flying type in-store advertising system
11: Unmanned aircraft

12: Personal computer (flight control terminal)
13: Aircraft body
21: Advertising paper sheet (advertising paper medium)
25: Internet line
26: Aircraft side communication means
27: Aircraft flight means
29: Obstacle avoiding means
30: LED light
31: Speaker
32: Aircraft side control means
35: Flight route setting means
36: Storage means
37: Terminal side communication means
38: Timer
39: Automatic data transmission means
42: Terminal side control means

What is claimed is:

1. A flying type in-store advertising system comprising:
an unmanned aircraft configured to display an in-store advertisement and a flight control terminal configured to control the unmanned aircraft, wherein:
the unmanned aircraft comprising:
an aircraft side communicator configured to receive flight route data of an in-store passage from the flight control terminal via wireless communication or via communication through an internet line; and
an aircraft controller configured to control the unmanned aircraft to fly in accordance with the flight route data;
the flight control terminal comprising:
a flight route setter configured to set the in-store passage;
a timer configured to set a time of day;
memory electrically connected to the aircraft controller, the memory being configured to store the flight route data and the time of day;
a terminal side communicator configured to send the flight route data to the unmanned aircraft at the time of day via the wireless communication or via the communication through the internet line; and
a terminal side controller configured to control the flight control terminal.

2. The flying type in-store advertising system according to claim 1, wherein the unmanned aircraft comprises a hooking tool configured to hook an advertising medium on which the in-store advertisement is displayed.

3. The flying type in-store advertising system according to claim 1, the unmanned aircraft further comprising:
a sensor configured to detect an approach to an obstacle and to output an approach signal, wherein the aircraft controller is configured to control the aircraft to avoid the obstacle based on the approach signal.

4. The flying type in-store advertising system according to claim 1, wherein the unmanned aircraft comprises a speaker.

5. The flying type in-store advertising system according to claim 1, wherein the unmanned aircraft comprises an LED light.

6. The flying type in-store advertising system according to claim 1, wherein the weight of the unmanned aircraft is 200 g or less.

7. The flying type in-store advertising system according to claim 1, wherein the unmanned aircraft comprises a parachute.

8. The flying type in-store advertising system according to claim 1, wherein the aircraft controller is configured to control an electrical system of the unmanned aircraft.

9. The flying type in-store advertising system according to claim 8, wherein the aircraft flight controller is configured to control a linear actuator to move a center of gravity of the unmanned aircraft, thereby altering an attitude of the unmanned aircraft during flight.

10. The flying type in-store advertising system according to claim 1, wherein the memory is RAM memory.

11. The flying type in-store advertising system according to claim 1, wherein the memory is ROM memory.

12. The flying type in-store advertising system according to claim 3, wherein the sensor is an ultrasonic sensor.

13. The flying type in-store advertising system according to claim 1, wherein the unmanned aircraft is a vertical take-off and landing quadcopter type flying drone.

14. The flying type in-store advertising system according to claim 13, wherein the vertical take-off and landing quadcopter type flying drone further comprises an aircraft body, four support arms radially extending at 90° intervals from the aircraft body, and a propulsion unit including a propeller and a motor disposed at an end of each of the support arms.

15. The flying type in-store advertising system according to claim 14, wherein the aircraft body further includes a right bumper and a left bumper arranged symmetrically on opposite sides of the aircraft body, the right bumper and the left bumper being connected to the aircraft body via two elongated support frames.

16. The flying type in-store advertising system according to claim 15, wherein the right bumper and the left bumper are configured as a gently-sloping two-mountain curved shape that extend beyond a rotational area of the propeller in a horizontal plane such that the right bumper and the left bumper help rebound the unmanned aircraft when coming into contact with an obstacle.

17. The flying type in-store advertising system according to claim 1, wherein the flight control terminal is a personal computer.

18. The flying type in-store advertising system according to claim 17, wherein the personal computer includes a monitor to display the in-store passage set by the flight route setter.

19. The flying type in-store advertising system according to claim 1, wherein the flight control terminal is a smart phone.

20. The flying type in-store advertising system according to claim 1, wherein the flight control terminal is a tablet.

* * * * *